(12) United States Patent
Kato et al.

(10) Patent No.: US 8,518,852 B2
(45) Date of Patent: Aug. 27, 2013

(54) BASE FOR CATALYST, CATALYST AND METHODS FOR PRODUCING THOSE

(75) Inventors: Yasuyoshi Kato, Kure (JP); Naomi Imada, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 126 days.

(21) Appl. No.: 12/065,037

(22) PCT Filed: Aug. 28, 2006

(86) PCT No.: PCT/JP2006/316859
§ 371 (c)(1),
(2), (4) Date: Apr. 28, 2008

(87) PCT Pub. No.: WO2007/026643
PCT Pub. Date: Mar. 8, 2007

(65) Prior Publication Data
US 2010/0069231 A1   Mar. 18, 2010

(30) Foreign Application Priority Data

Aug. 29, 2005 (JP) ................................. 2005-247629
Feb. 6, 2006 (JP) ................................. 2006-028119

(51) Int. Cl.
*B05D 3/02* (2006.01)
(52) U.S. Cl.
USPC ........... 502/309; 502/242; 502/247; 502/254; 502/255; 502/527; 502/439; 502/209
(58) Field of Classification Search
USPC ........................ 502/309, 254, 255, 527, 439
See application file for complete search history.

(56) References Cited

U.S. PATENT DOCUMENTS

| 5,294,584 A * | 3/1994 | Yoshida et al. ............... 502/242 |
| 6,890,436 B2 * | 5/2005 | Komatsu et al. ......... 210/500.41 |
| 2007/0292673 A1 * | 12/2007 | Katagiri et al. ............... 428/219 |

FOREIGN PATENT DOCUMENTS

| JP | 2001-025688 | 1/2001 |
| JP | 2004-033855 | 2/2004 |
| JP | 2004-339648 | * 11/2004 |
| JP | 2004-339748 | * 11/2004 |

OTHER PUBLICATIONS

International Search Report for PCT/JP2006/316859.

* cited by examiner

*Primary Examiner* — Melvin C Mayes
*Assistant Examiner* — Colette Nguyen
(74) *Attorney, Agent, or Firm* — Fay Sharpe LLP (57) ABSTRACT

The present invention provides a catalyst base material and a catalyst which have high strength, high porosity or high activity and methods of producing the catalyst base material and catalyst. The present invention relates to a method of producing a catalyst base material, the method comprising dispersing or dissolving a hydrophilic polymer coagulant as a first component, a water-soluble thickener as a second component, a colloidal inorganic binder as a third component and an inorganic fiber as a fourth component in water to form a catalytic slurry or paste, supporting the catalytic slurry or paste on a net-like substrate such that the meshes of the net-like substrate are filled up with the slurry or paste, by drying and/or calcinating the substrate.

15 Claims, 2 Drawing Sheets

BASE FOR CATALYST, CATALYST AND METHODS FOR PRODUCING THOSE

TECHNICAL FIELD

The present invention relates to a catalyst base material suitably used as a catalyst support, a method of producing the catalyst base material, a catalyst using the catalyst base material and a method of producing the catalyst, and, particularly, to a catalyst base material suitable to obtain a light-weight and highly active exhaust gas denitration catalyst, a denitration catalyst using the catalyst base material and methods of producing these catalyst base material and catalyst.

BACKGROUND ART $NO_x$ in exhaust gas discharged from a power station, various factories, vehicles and the like is the causes of photochemical smog and acid rain. As a method used to remove $NO_x$ efficiently, an exhaust denitration method utilizing selective catalytic reduction using ammonia ($NH_3$) or the like as a reducing agent is used in wide fields including a thermal power station. As the catalyst, titanium oxide ($TiO_2$) type catalysts using vanadium (V), molybdenum (Mo) or tungsten (W) as an active component is used. Particularly, catalysts containing vanadium as one of the active components not only have high activity but also is reduced in a deterioration due to impurities contained in exhaust gas and also can be used at lower temperatures. These catalysts are therefore currently used as main denitration catalysts (Patent Document 1). The catalyst is generally made into various forms such as a honeycomb-form and a plate-form upon use and also, various production methods of the catalyst have been invented and designed. Among these catalysts, net-like products obtained by processing a metal thin plate into a metal lath which is then coated with aluminum by flame coating and a catalyst structure obtained by a method in which using a ceramic fiber woven fabric or nonwoven fabric as a substrate, the above catalyst component is applied and pressure-bonded to the substrate to obtain a plate catalyst and then, the obtained plate catalyst is processed into an element having wave projections (spacer part) and the elements are stacked on each other have excellent characteristics that these catalysts are decreased in draft loss and are resistant to clogging with dust and burned ash of coal and are currently used in many denitration apparatuses for exhaust gas from the boiler of thermal power generation (Patent Documents 2 and 3).

In the meantime, as a method of producing a catalyst containing inorganic fibers relating to the above descriptions, many methods are known, these methods including a method in which a paste obtained by kneading a catalyst component with an inorganic fiber is applied in such a manner as to fill up the meshes of a metal lath (Patent Document 4), a method in which a nonwoven fabric sheet of ceramic fibers is impregnated with a catalyst component (Patent Document 5) and a method in which a ceramic fiber corrugated honeycomb support is made to carry a catalyst slurry (Patent Document 6). Also, as the latter method of producing a catalyst support by using an inorganic fiber nonwoven fabric sheet, many methods making use of paper-making technologies have been long known.

Patent Document 1: Japanese Patent Application Laid-Open No. 50-128681
Patent Document 2: Japanese Patent Application Laid-Open No 54-79188
Patent Document 3: Japanese Patent Application Laid-Open No 59-73053
Patent Document 4: Japanese Patent Application Laid-Open No 54-79188
Patent Document 5: Japanese Patent Application Laid-Open No. 2-169028
Patent Document 6: Japanese Published Examined Application No. 58-11253

DISCLOSURE OF THE INVENTION

Problems to be Solved by the Invention

Among these technologies, the method in which an inorganic fiber and a catalyst component are applied to a metal substrate provides high strength and is therefore superior but, on the contrary, has the problem concerning a difficulty in improving the porosity of the substrate. On the other hand, the method in which an inorganic fiber sheet or a corrugated honeycomb is impregnated or coated with a catalyst component has the problem that it has a difficulty in providing high strength though a porous and highly active catalyst is easily obtained.

It is an object of the present invention to solve the above prior art problems and to provide a high strength, porous or highly active catalyst base material and catalyst, and a method of producing each of these catalyst base material and catalyst. More specifically, it is a first object of the present invention to provide a novel catalyst base material (support) which is easily made into a catalyst and may be reasonably called a super porous support by compounding a metal or inorganic fiber net-like product making it easy to obtain high strength with inorganic short fibers. Another object of the present invention is to attain a denitration catalyst which is light-weighted, and has high strength and high activity by making use of the characteristics of the super porous support to make the support carry a slight amount of a catalyst component.

Means for Solving the Problem

The above problems can be attained by the following invention as claimed in the claims of the patent application of this case.

(1) A method of producing a catalyst base material, the method comprising dispersing or dissolving a hydrophilic polymer coagulant as a first component, a water-soluble thickener as a second component, a colloidal inorganic binder as a third component and an inorganic fiber as a fourth component in water to form a catalytic slurry or paste, supporting the catalytic slurry or paste on a net-like substrate such that the meshes of the net-like substrate are filled up with the slurry or paste, by drying and/or calcinating the substrate.

(2) A method of producing a catalyst base material according to (1), wherein an inorganic oxide powder is further added to said first to fourth components and the obtained mixture is dispersed or dissolved in water to obtain a slurry or a paste which is supported on said net-like substrate such that the meshes of the net-like substrate are filled up with the slurry or paste, followed by drying and/or calcinating the substrate.

(3) A method of producing a catalyst base material according to (1), wherein an inorganic porous material having a pore volume of 0.2 cc/g or more and 1.0 cc/g or less is further added as a fifth component to said first to fourth components and the obtained mixture is dispersed or dissolved in water to obtain a slurry or a paste which is supported on said net-like substrate such that the meshes of the net-like substrate are filled up with the slurry or paste, followed by drying and/or calcinating the substrate.

(4) A method of producing a catalyst base material according to (3), wherein the method of adding the inorganic porous material as the fifth component comprises mixing a slurry-like material obtained by mixing water with the inorganic porous material in advance, and then with said first to fourth components.

(5) A method of producing a catalyst base material according to (4), wherein the ratio by volume of a hydrated gel of the first component to the slurry-like material obtained by adding water to the inorganic porous material as the fifth component exceeds 0 and is 2 or less.

(6) A method of producing a catalyst base material according to any one of (3) to (5), wherein said inorganic porous material is diatomaceous earth and/or amorphous silica.

(7) A method of producing a catalyst base material according to any one of (1) to (6), wherein said method of carrying the slurry or paste on the net-like substrate such that the meshes of the net-like substrate are filled up with the slurry or paste comprises passing a belt-like sheet as the net-like substrate through the slurry or paste and then passing the sheet between a pair of rollers or a pair of scrapers placed at a fixed interval to remove superfluous slurry or paste supported on the sheet.

(8) A method according to any one of (1) to (7), wherein said hydrophilic polymer coagulant which is the first component is one or more compounds selected from a polyacrylic acid amide or a polyacrylic acid, copolymers of these monomers, derivatives of these compounds, graft copolymers of these compounds and organic materials having other carboxyl groups, mannan and fucoidan.

(9) A method according to any one of (1) to (7), wherein said water-soluble thickener that is the second component is at least one compound selected from polyvinyl alcohol, carboxy cellulose, albumen and glue.

(10) A method according to any one of (1) to (7), wherein said colloidal inorganic binder which is the third component is at least one compound selected from a silica sol, an alumina sol and a zirconia sol.

(11) A method according to any one of (1) to (7), wherein said second component is polyvinyl alcohol and the third component is colloidal silica.

(12) A catalyst base material produced by the method according to any one of (1) to (8).

(13) A catalyst for removing nitrogen oxides wherein a catalyst component containing titanium oxide and oxides of one or more elements selected from tungsten, molybdenum and vanadium is supported on the catalyst base material according to (12).

(14) A method of producing a catalyst for removing nitrogen oxides, the method comprising forming the catalyst base material according to (12) into a specified shape and then passing the obtained catalyst base material through a catalytic slurry obtained by dispersing or dissolving titanium oxide and an oxide of one or more elements selected from tungsten, molybdenum and vanadium or salts of these oxides in water, followed by draining off, drying and calcinating said base material.

(15) A method of producing a catalyst for removing nitrogen oxides, the method comprising forming the catalyst base material according to (12) into a specified shape and then passing the obtained catalyst base material through a catalytic slurry obtained by dispersing or dissolving an oxide of one or more elements selected from titanium, tungsten, molybdenum and vanadium or salts of these oxides in water, followed by draining off, drying and calcinating said base material.

(16) A method of producing a catalyst for removing nitrogen oxides according to (14) or (15), wherein said base material has a spacer part for stacking said catalyst base materials.

(17) A method of producing a catalyst for removing nitrogen oxides, the method comprising dipping a structural body obtained by stacking two or more of the catalyst base materials according to (16) and setting the stacked catalyst base material in a frame to form a unit in a catalytic slurry obtained by dispersing or dissolving titanium oxide, oxides of one or more elements selected from, tungsten, molybdenum and vanadium or their salts in water, followed by draining off, drying and calcinating said base materials in the unit.

Effect of the Invention

According to the present invention, a net-like base material and an inorganic fiber can be compounded into a porous material, thereby making it possible to attain a highly strong and highly active catalyst base material and catalyst which are remarkably increased in the pore volume necessary to carry a catalyst. Moreover, the addition of an inorganic porous material in a catalyst base material prevents the produced catalyst from being abraded even in exhaust gas containing a lot of dust components as in the case of coal firing, making it possible to significantly improve the life of the catalyst. When the catalyst base material of the present invention is used, a porous denitration catalyst having long strength and high life is obtained and can therefore realize a catalyst having high denitration ability even in a catalyst amount which is a fraction of the usual amount. Also, according to the method of the present invention, an excellent catalyst base material can be produced by such a simple processes that a sheet-like net-like base material is dipped in a slurry containing an inorganic fiber, a liquid is drained off and the base material is then dried. Also, the method of the present invention enables the formation of a catalyst by using a small number of steps and is therefore superior in production costs and productivity.

[Action]

Detailed explanations will be furnished as to the actions of the catalyst base material and catalyst according to the present invention to solve the above problems.

Figure 5:
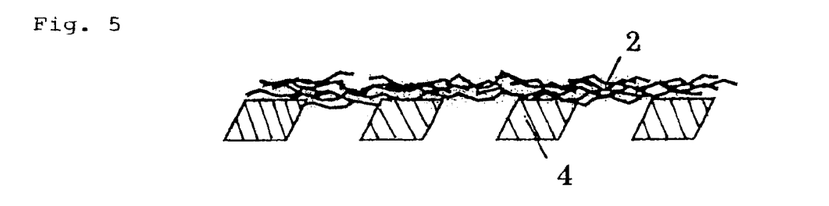
FIG. 5 is a typical view showing the state of a net-like base material and an inorganic fiber in a catalyst base material according to prior art.

Many inorganic fiber sheets for catalyst support which are conventionally known as a catalyst base material using an inorganic fiber are obtained by processing a pulp-like material composed of an inorganic fiber and a binder by a paper-making machine. This paper-making method may be used to compound an inorganic fiber with a net-like material such as wire netting. However, if the concentration of the inorganic fiber in the pulp-like material is high, the fibers are entangled among them to make it difficult to process these fibers by a paper-making machine. This makes it inevitable to lower the concentration of the inorganic fiber when a paper-making machine is used. If it is intended to deposit a certain amount of the inorganic fiber to the net-like material, it is necessary to repeat the paper-making step. Also, in this case, water is removed repeatedly in the paper-making steps to form a densified inorganic layer 2 on one surface of the net-like material 4 as shown in FIG. 5, to make it difficult to produce a porous catalyst support.

In the catalyst base material of the present invention, on the contrary, the net-like material is made to support an aqueous slurry or paste obtained using a hydrophilic polymer coagulant as a first component, a water-soluble thickener as a second component, a colloidal inorganic binder as a third component, an inorganic fiber as a fourth component and, as required, an inorganic oxide powder or/and an inorganic porous material as a fifth component in such a manner as to fill up the meshes of the net-like material with the slurry or paste, wherein particularly, the hydrophilic polymer coagulant as the first component is used, thereby making it easy to compound the net-like base material with the inorganic fiber into a porous material and also makes it possible to produce a catalyst base material by a simple process.

Figure 1:
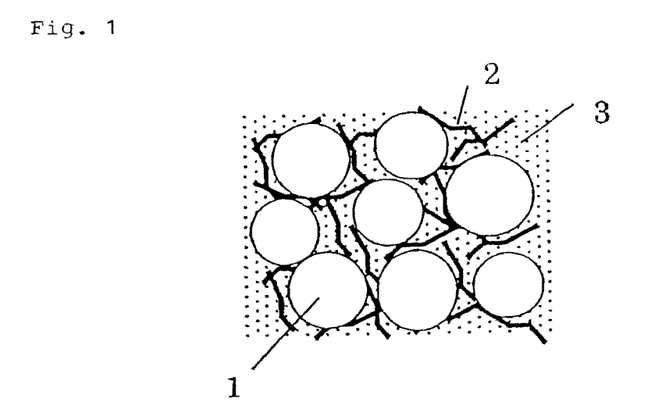
FIG. 1 is an explanatory view typically showing the state of a hydrophilic polymer coagulant in an inorganic fiber slurry or paste used for the production of a catalyst base material according to the present invention.
Figure 2:
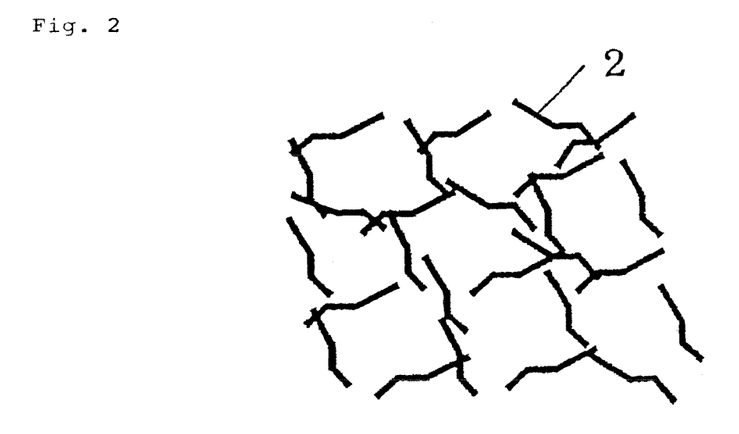
FIG. 2 is a typical view showing the condition of the distribution of inorganic fibers after the inorganic fiber slurry or paste shown in FIG. 1 is burned and calcinated.
Figure 3:
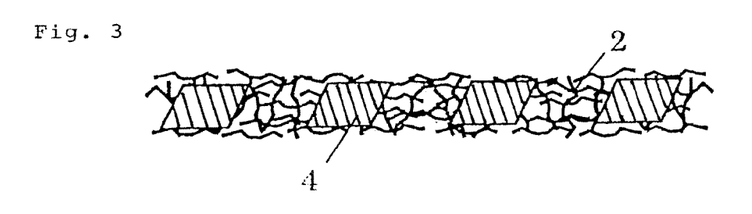
FIG. 3 a typical view showing the combined state of a net-like material and an inorganic fiber in a catalyst base material according to the present invention.

Specifically, a powder of a hydrophilic polymer coagulant containing an amide group, carboxyl group and the like which is the first component of the present invention absorbs water to form a gel-like particles swollen 300 to 500 times that of the self-weight. When, for example, a polymer coagulant powder having a diameter of 20 to 50 μm is used, a hydrated gel particles having a diameter of about 120 to 300 μm is formed as a sherbet-like material. In the present invention, the net-like base material is made to support a slurry-like material in which the inorganic fiber as the fourth component is dispersed together with the organic binder and inorganic binder which are the second and third components respectively and as required, the inorganic oxide such as titanium oxide as the fifth component in clearances between the swollen gel particles, wherein inorganic fibers 2 are, as shown in FIG. 1, dispersed in a medium 3 containing the water-soluble thickener and water by means of the polymer coagulant particles 1. When the resulting material is dried, the water in the polymer coagulant particles is released, to leave the space occupied by the swollen polymer coagulant as macropores with the result that as shown in FIG. 2, a porous catalyst base material which contains inorganic fiber 2 is formed in which macropores are developed so as to make it easy to support the catalyst component.

Moreover, in the catalyst base material and production method according to the present invention, a swollen large gel of the polymer coagulant exists between the inorganic fibers to thereby prevent the inorganic fibers from entangling among them and also serves as a roller. Therefore, the resulting slurry or paste has the characteristics that it has high fluidity and is therefore easily supported inside the meshes of the net-like base material even if the content of the inorganic fiber is high. In addition, the inorganic fiber and organic binder existing in clearances between the swollen gels combine the swollen gels with each other, to promotes the formation of a sherbet-like slurry or paste. Therefore, the slurry or paste is holded in the meshes once it enters into the net-like material, so that the meshes are not opened because the slurry or paste is prevented from flowing out. Therefore, not only a thin plate support having a large area can be easily obtained, but also the band-like net-like material can be made to support the slurry continuously and conveyed and dried as it is. Accordingly, a lath plate or wire net 4 having a plate thickness of 0.2 to 0.5 mm and an opening of 1 to 2 mm can be made to carry the slurry or paste in such a manner that the meshes are filled with the slurry or paste. Therefore, a catalyst base material having excellent characteristics is obtained as a new composite support in which the inside of the inorganic fiber porous sheet is reinforced with a fine wire.

Also, the water-soluble thickener (second component) such as polyvinyl alcohol which is insolubilized by heat and the inorganic binder (third component) such as colloidal silica which are to be added to the slurry, promote the coupling of the inorganic fibers among them in the drying and calcinating processes. Therefore, the catalyst base material of the present invention is resistant to deformation, and in the case of a plate base material, not only a shape such as an angle form or wave form having a spacer function can be formed by press molding after the base material is dried, but also the inorganic fiber is not dispersed again in water or the like as it is once dried.

Moreover, the catalyst base material has the characteristics that if the catalyst base material is calcinated after it is made to support the catalyst component, the above water-soluble thickener burns down but the inorganic binder such as colloidal silica strengthens the coupling between the inorganic fibers and the coupling between the inorganic fiber and the net-like base material with the result that a catalyst which is porous but has high strength can be obtained.

In the present invention, a support obtained by applying the sherbet slurry containing the first to fourth components to a net-like material obtained by plain-weaving of a wire net, metal lath or inorganic fiber yarn, followed by drying, is made into a porous material because the polymer coagulant is burned down by the drying to form pores as relatively large as several tens of μm to about 100 μm. When the catalyst slurry containing water in an amount of 60 to 70% is carried in the pores, the water is dissipated when the support is dried with the result that 60 to 70% of the pores are formed into voids (fine holes). The presence of many voids promotes the diffusion of gas and therefore, the support is a highly active catalyst support. However, if many voids are present in the support, in exhaust gas containing a lot of ash, the ash collides with the support, leading to a progress of abrasion. Because pores formed in the support have a diameter of 10 μm to 100 μm while the particles of the ash have a diameter of about several tens of μm, there is the problem that the ash particles collide to the inside of pores, and catalyst particles (of the order of 10 nm) adhered to the support itself and the inside of pores are peeled off by the collision with the ashes. Therefore, an inorganic oxide powder may be added as the fifth component to improve the strength of peeling off. However, these inorganic oxide powders have the problem that although if the amount of these inorganic oxide powders is large, the binding strength is increased, the porosity is reduced and therefore, the catalyst slurry to be supported thereon is not carried inside of the support but supported only on the surface, so that a thin layer formed only of the catalyst components is made on the surface of the support, with the result that the catalyst layer is simply peeled from the support when it collides with dust and the like, leading to short catalyst life.

It has been found that in order to solve this problem, it is effective to replace a part of the polymer coagulant hydrated gel with the inorganic porous material having a pore volume of 0.2 to 1.0 cc/g as the fifth component. Specifically, in the case of a slurry obtained by adding the inorganic oxide particles to the above first to fourth components, the hydrated gel disappears to form voids when the slurry is dried, whereas the slurry obtained by replacing a part of the polymer hydrated gel with the specified inorganic porous material has a necessary pore volume even after drying so that it can form a firm skeleton capable of keeping a gas passage. Especially, diatomaceous earth is a material having a large number of pores inside of a skeleton of silicon as mentioned above. As the skeleton is very firm, the diatomaceous earth is, unlike the hydrated gel, free from such a phenomenon that it is dissipated by drying or its skeleton is broken, resulting in dissipation of pores in the production process. Therefore, diatomaceous earth is capable of forming a firm support, while a necessary porosity is kept. This ensures that the catalyst slurry can be sufficiently immersed in and carried to the inside of the support and also, fine pores capable of promoting the diffusion of gas can be maintained. This makes it possible to obtain a catalyst support having high activity but also high strength without causing peeling or abrasion.

BEST MODE FOR CARRYING OUT THE INVENTION

The catalyst base material in the present invention means a base material or a substrate using a net-like base material as its base to support a catalyst component, and examples of them include, besides a plate base material, those prepared by molding the plate base material into a wave form or angular form to provide a spacer function, three-dimensional structures obtained by stacking two or more of the above base materials and sterically molded articles.

As the hydrophilic polymer coagulant which is the first component of the present invention, any material may be used insofar as it absorbs water to form swollen gel particles. The hydrophilic polymer coagulant may be a polyacrylic acid amide or polyacrylic acid having, for example, an amino group, a carboxyl group, etc., graft polymer of the above monomer and an organic carboxyl group having other carboxyl group, konnyaku powder (mannan) or kelp powder or powder of its ingredient (for example, fucoidan). As to its particle diameter, any size may be used. If the diameter of a particle in a swollen state is large, macropores are easily grown, whereas if the diameter in a swallen state is small, middle pores are grown. The amount of the hydrophilic polymer coagulant to be added is preferably 0.1 to 2% by weight, more preferably 0.1 to 1.0% by weight based on the total weight of a slurry depending on the properties of the coagulant. When the amount is too small, pores are only insufficiently formed, whereas if the amount is too large, the slurry state is not obtained. The hydrophilic polymer coagulant can be uniformly mixed with other components, if it is swollen with water in advance, and added to the other components as a sherbet-like hydrated gel having the above concentration.

As the water-soluble thickener which is the second component, those having the characteristics that produce a thickening effect when they are put into a slurry state and are insolubilized without being thermally decomposed at the drying temperature. Examples of the water-soluble thickener include polyvinyl alcohol, carboxy cellulose, proteins such as the albumen and glue. Also, if the water-soluble thickener has an action of a surfactant which lowers the surface tension of a slurry, it is preferably supported. The amount of the water-soluble thickener is, though not particularly limited to, 0.1 to 2% by weight and preferably 0.1 to 1.0% by weight. If the thickener is used in a large amount, it causes heat generation during calcinating.

As the colloidal inorganic binder which is the third component, a sol-like material such as a silica sol, alumina sol or zirconia sol may be used. When the binder is mixed with an organic material of the above first or second component, it forms a gel though depending on its concentration. In such cases, pH adjustment or the like may be necessary. Also, the use of a sol having strong acidity or alkalinity causes a release of water from the swollen polymer coagulant gel. Therefore the amount of the sol is limited. A combination of polyvinyl alcohol and colloidal silica tends to produce good results without causing gelation and denaturing of the absorber gel. When the amount of the inorganic binder is too small, the strength of the catalyst base material after calcinating is low, whereas when the amount of the inorganic binder is too large, the binding strength among the inorganic fibers becomes so high that the catalyst base material becomes fragile, and therefore, in the case of silica, an amount from 2 to 8% by weight gives good results.

Moreover, examples of the inorganic fiber which is the fourth component include E glass short fibers, silica-alumina type ceramic fibers and whiskers such as SiC. As to the length of the fiber, fibers having a fiber length close to the diameter of the opening of the net-like base material provides good effects. If the fiber is too short, it is difficult to obtain proper strength, whereas if is too long, the inorganic fiber is difficult to be supported in the meshes of the net-like base material. In case where the inorganic fiber is used for a base material of the denitration catalyst, a fiber length of 100 to 150 µm tends to bring about good effects.

As the inorganic oxide particles that are optional components used in the present invention, for example, micropowders of titanium oxide, silicon oxide or aluminum oxide may be used. The adhesive strength of the supported inorganic fiber can be improved by the addition of these inorganic oxide particles. Though there is no particular limitation to the amount of the inorganic oxide particles to be added, a too small amount produces an unsatisfactory strength-improving effect, whereas a too large amount results in the loss of porosity. If an amount 1 to 8 times the weight of the inorganic fiber is used as the amount of the inorganic oxide particles, good effects will be obtained usually though depending on the type and bulkiness of the oxide particles to be added.

Also, the inorganic porous material used as the fifth component of the present invention is an inorganic material having a large number of pores therein, and diatomaceous earth and amorphous silica are exemplified. The pore volume of the inorganic porous material is 0.2 cc/g or more and 1.0 cc/g or less and preferably 0.3 cc/g or more and 0.8 cc/g or less. When the pore volume of the inorganic porous material is less than 0.2 cc/g, the porosity is reduced though the strength is increased, whereas when the pore volume of the inorganic porous material exceeds 1.0 cc/g, the strength is reduced though the porosity is increased. Among exemplified materials, diatomaceous earth is a fossil of a diatom and is a chemically stable material having many pores in a silica skeleton, which is firm and is hardly broken. Examples of diatomaceous earth to be used in the present invention include diatomaceous earth used as a filter aid. However, there is no particular limitation to the diatomaceous earth to be used in the present invention insofar as it has the above pore volume. If a diatomaceous earth is treated by acid washing in order to elute an alkali metal, alkali earth metal or iron contained therein, the adverse influence of the inorganic porous material on the performance of the catalyst is reduced when the catalyst is used for a long period of time. Also, the above silicon oxide includes crystalline silica and amorphous silica. Among them, amorphous silica has a relatively firm three-dimensional structure in which primary particles are coagulated and also has a large pore volume and is therefore preferred. On the other hand, crystalline silica such as quartz is not preferred because the porosity is decreased though it has no pore volume and has therefore high strength. Also, in case where inorganic porous material is combined with other inorganic oxide powder, for example, titanium oxide, silicon oxide or aluminum oxide powder, having no pore volume, this is preferable because the adhesion to the inorganic fiber is increased. If the amount of these other inorganic oxides is too large, the porosity tends to decrease and therefore, the amount of these inorganic oxides is preferably 1 to 8 times the weight of the inorganic fiber of the fourth component though depending on the type and bulkiness of the oxide particles to be added.

As to a method of adding the inorganic porous material used as the fifth component, in case where other first to fourth components are added after water is added in advance to the inorganic porous material, these other components are prevented from penetrating into the inside of pores of the inorganic porous material to cause the loss of porosity, which produces good effects. Particularly, when water is added to the inorganic porous material, which is then mixed with the hydrated gel of the polymer coagulant which is the first component and then with other components, these other components can be uniformly mixed with each component, making it possible to obtain a more uniform slurry material. If the amount of water to be added is almost the same as the volume corresponding to the pore volume of the porous material, this is preferable because the pores are filled up with water. If the amount of water exceeds the above amount, the viscosity of the slurry is decreased due to extra water, whereas if the amount of water is less than the above, there is a concern that other components penetrates into pores.

As to the amount of the inorganic porous material to be added, the ratio by volume of the hydrated gel as the first component to the inorganic porous material to which water is added exceeds 0 and 2 or less, preferably in a range from 0.5 to 1.5, produces good effects. When the ratio is less than the above range, there is a case where high strength is not obtained though a high porosity is obtained, whereas when the ratio is larger than the above range, there is a case where a smooth slurry state cannot be maintained and therefore it is difficult to support the inorganic porous material on the net-like material such as a lath.

When a sherbet slurry containing the above first to fourth components or the above first to fifth components is applied to a net-like material obtained by plain-weaving of a wire net, metal lath or inorganic fiber yarn, and then a superfluous slurry on the surface is removed by a pair of rollers or a pair of scrapers, followed by drying, a porous catalyst base material can be obtained. The obtained base material has large pores formed in an aggregate of the inorganic fibers present on the surface layer part and in the meshes of the net-like material. The drying temperature of the base material is preferably 150 to 200° C., at which temperature such a phenomenon is avoided that the second component is denatured by heat into an insolubilized one and is heat-decomposed to lose its flexibility in view of strength. However, a material obtained by heating up to, for example, 500° C. to decompose and remove the organic material, may also be used as the catalyst base material.

In order to support the denitration catalyst component on the catalyst base material, typically, the inorganic fiber and metal net-like material composite according to the present invention a known denitration catalyst component may be applied. A catalyst component composed of titanium oxide and one or more elements selected from tungsten, molybdenum and vanadium as shown in, for example, Japanese Patent Application Laid-Open 50-128680 is, in advance, prepared and milled into a powder, which is dispersed either in water or in water containing the inorganic binder such as colloidal silica to prepare a slurry. The foregoing catalyst base material is dipped in the slurry, followed by draining off, drying and calcinating, whereby the denitration catalyst of the present invention is easily obtained. The method of making a catalyst is not limited to this and another method may be applied. A slurry obtained by dispersing or dissolving titanium oxide and oxides of one or more elements selected from tungsten, molybdenum and vanadium or its salt in water may be also supported on the catalyst base material.

Figure 4:
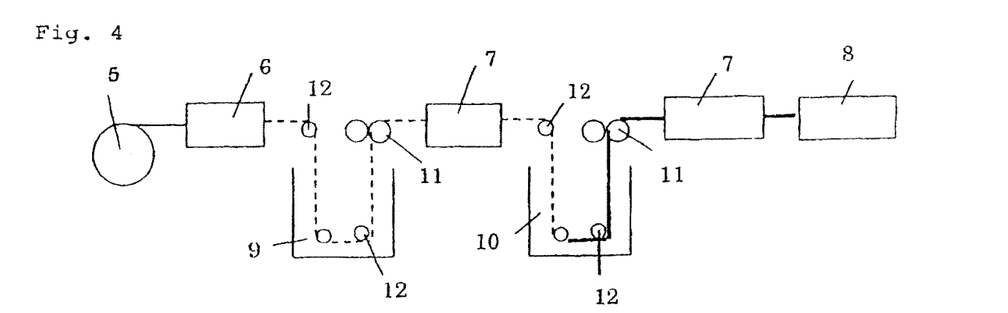
FIG. 4 is an explanatory view showing an example of a continuous production method of a catalyst base material and a catalyst according to the present invention.

To produce the above catalyst base material and catalyst continuously, a method may be applied in which, as shown in, for example, FIG. 4, a rolled band-like SUS plate 5 is supplied to a metal lath processing machine 6 to carry out metal lath processing, is then made to pass through the inorganic fiber slurry 9 according to the present invention by a conveying roller 12, is then subjected to a pair of draining rollers 11 or a pair of scrapers to remove a superfluous slurry, is then dried by a dryer 7, and thereafter passed through a slurry 10 containing a catalyst component, followed by carrying out the same procedures including draining, drying, as required, forming a wave form or angular form as a spacer part by using a molding machine 8, and then calcinating. Also, after a plate-like catalyst base material is obtained in which a spacer part having a specified shape such as an angular form or wave form is formed by using the above method, two or more of the plate-like catalysts may be stacked and then set in a frame to make a catalyst unit, which is then dipped in the catalyst slurry, followed by draining, drying and calcinating.

The catalyst base material and catalyst according to the present invention have, for example, the characteristic that the catalyst base material and catalyst dried once never be fallen off from the net-like material due to the effect of the water-soluble thickener which is the second component even if it is deformed, for example, by press molding carried out to form the spacer part. Therefore, a molding or cutting process may be applied in a desired stage of the production process, showing such a merit that a catalyst production method that meets the needs can be adopted.

The present invention will be explained in more detail.

EXAMPLES

Example 1

6 g of a polyacrylic acid amide type polymer coagulant (trade name: Sunfresh ST500MPSA, manufactured by Sanyo Chemical Industries, Ltd., particle diameter: 20 to 50 µm) as a first component was suspended in 994 g of water to prepare a sherbet-like hydrated gel. Separately, 10 g of polyvinyl alcohol (trade name: Kuraray Poval 117, manufactured by Kuraray Co., Ltd.) was dissolved in 90 g of water to make a second component solution.

Next, 160 g of silica sol (manufactured by Nissan Chemical Industries, Ltd., $SiO_2$ content: 20% by weight) as a third component, 64 g of the second component solution and 640 g of the first component hydrated gel were mixed with each other and 80 g of a milled fiber made of E-glass (diameter: 10 µm, length: 150 µm) was added to the above mixture solution to prepare a sherbet like slurry.

Separately, SUS430 band steel having a thickness of 0.2 t was subjected to metal lath processing and then rolled down to a thickness of 0.5 t to prepare a net-like base material having a mesh of about 1 mm×2 mm. This base material was cut into a band-like form of 100×250 mm, which was then made to pass through the previously prepared slurry and then between two fluororesin rollers to drain, followed by drying at 150° C. to obtain a catalyst base material according to the present invention.

Example 2

6 g of a polyacrylic acid amide type polymer coagulant (trade name: Sunfresh ST500MPSA, manufactured by Sanyo Chemical Industries, Ltd., particle diameter: 20 to 50 µm) as a first component was suspended in 994 g of water to prepare a sherbet-like hydrated gel. Separately, 10 g of polyvinyl alcohol (trade name: Kuraray Poval 117, manufactured by Kuraray Co., Ltd.) was dissolved in 90 g of water to make a second component solution.

Next, 200 g of microparticle titanium oxide (trade name: CR-50, manufactured by Ishihara Sangyo Kaisha Ltd.) as a fifth component was added to a solution obtained by mixing 200 g of silica sol (manufactured by Nissan Chemical Industries, Ltd., $SiO_2$ content: 20% by weight) as a third component with 64 g of the second component solution and then 240 g of the first component hydrated gel was mixed. Then, 34 g of a milled fiber made of E-glass (diameter: 10 μm, length: 150 μm) was added to the above mixture solution to prepare a sherbet like slurry.

The same net-like base material used in Example 1 was made to pass through the above slurry and the same procedures as in Example 1 were conducted to prepare a catalyst base material.

Examples 3 and 4

Each catalyst base material obtained in Examples 1 and 2 was baked at 500° C. for 2 hours to prepare catalyst base materials.

Example 5

A glass fiber net-like base material was used instead of the metal lath base material used in Example 1 to obtain a catalyst base material.

A 0.5 m×50 m E-glass cloth obtained by leno-weaving twisted yarn composed of 1600 filaments having a fiber diameter of 6μ was dipped in a slurry constituted of 10% by weight of $SiO_2$, 50% by weight of $TiO_2$ and 1% by weight of polyvinyl alcohol, which was balanced by water, then drained off by a sponge roller and then dried at 150° C. for 30 minutes to prepare a reinforced net-like material. The number of meshes of the net-like material per inch was 11.

Comparative Example 1

A catalyst base material was prepared in the same manner as in Example 1 except that water was used in place of the first component hydrated gel used in Example 1 in the same amount to prepare a slurry.

Comparative Example 2

A catalyst base material was prepared in the same manner as in Example 1 except that water was used in place of the second component solution used in Example 1 in the same amount to prepare a slurry.

Comparative Example 3 and 4

Catalyst base materials were prepared in the same manner except that water was used in place of the silica sol used in Examples 3 and 4.

Each support obtained in Examples 1 to 5 and Comparative Examples 1 to 4 was deformed along a round bar of 25-mm diameter with dipping it in water to confirm the strength for supporting inorganic fibers, to measure water absorption that was an index to the pore volume, thereby judging whether the sample was suitable for impregnation or coating with the slurry as the catalyst support. The results obtained are shown collectively in Table 1.

TABLE 1

| No. | Example No. | Amount of the inorganic material supported (g/m²) | Test results of dipping in water and bending | Water absorption of the base material (porosity) (g/g) |
|---|---|---|---|---|
| 1 | Example 1 | 100 | Neither peeling nor Falling off is observed | 2.57 |
| 2 | Example 2 | 350 | Same the above | 0.51 |
| 3 | Example 3 | 98 | Same the above | 2.64 |
| 4 | Example 4 | 342 | Same the above | 0.66 |
| 5 | Example 5 | 138 | Same the above | 2.87 |
| 6 | Comp. Ex. 1 | 31 | Many fibers are present in the surface layer part and are peeled off | 0.1 |
| 7 | Comp. Ex. 2 | 22 | Most of the inorganic fiber is fallen off and suspended in water | Unmeasurable |
| 8 | Comp. Ex. 3 | 22 | Same the above | Same the above |
| 9 | Comp. Ex. 4 | 22 | Same the above | Same the above |

Each catalyst support obtained in Examples 1 to 5 had strength enough to prevent the inorganic fiber from being falling off from the catalyst base material even in the operation of dipping it to deform. In the case of the catalyst supports obtained in Comparative Examples 3 and 4, on the other hand, the inorganic fibers were fallen off immediately by dipping it in water or almost peeled off by the deforming operation.

Also, judging from the results of the measurement of the water absorption based on the component to be supported, the supports of Examples respectively have an water absorption as very large as 0.5 to 2.6 g/g and it is clear that these supports are suitable for supporting the catalyst component. The water absorption of the support of Comparative Example 1 which was an only material that prevented the inorganic fiber from falling off was as low as 0.1 g/g. The reason for this is considered to be that the inorganic fibers were entangled and only a few fibers were supported on the surface layer part and the formation of pores due to the hydrated gel did not proceed.

As mentioned above, it is understood that the catalyst base material of the present invention not only is very porous but also has sufficient water resistance and that it is a catalyst base material which has high strength owing to the combined effect of a metal or ceramic net-like base material and the porous inorganic fiber sheet and is superior in handling.

Examples 6 to 10

15 kg of an aqueous ammonium metatungstate solution ($WO_3$ content: 50%) and 3.0 kg of ammonium metavanadate were added to 46.7 kg of a titanium oxide powder (trade name: MCH, manufactured by Ishihara Sangyo Kaisha Ltd., $SO_4$ content: 2% by weight)), followed by kneading the mixture using a kneader. The obtained paste was granulated, dried and calcined at 500° C. for 2 hours. 300 g of a powder obtained by pulverizing the obtained granules was added to a solution consisting of 210 g of silica sol (manufactured by Nissan Chemical Industries, Ltd., $SiO_2$ content: 20% by weight) and 420 g of water to prepare a Ti—W—V catalyst slurry.

Each of the catalyst base materials prepared in Examples 1 to 5 was dipped in the obtained slurry and then drained off using a fluoroplastoc bar as a scraper, followed by drying at 150° C. and calcinating at 500° C. for 2 hours.

The obtained catalyst was cut into a strip of 100 mm×20 mm to measure its denitration ability in the condition shown in Table 2.

TABLE 2

| Amount of Gas | 3 l/min |
| Area velocity | 51 m/h |
| Temperature | 350° C. |
| Gas composition | |
| NO | 200 ppm |
| $NH_3$ | 240 ppm |
| $SO_2$ | 500 ppm |
| $CO_2$ | 12% |
| $O_2$ | 3% |
| $H_2O$ | 12% |

Comparative Example 5

3 kg of the catalyst powder used in Example 6, 0.6 kg of silica sol and 1.2 kg of water were placed in a small kneader and kneaded into a paste state. 0.45 kg of a silica-alumina type inorganic fiber was added to this paste to obtain a catalyst paste. This paste was placed on the metal base material used in Example 1 and applied in such a manner as to fill up the meshes of the base material by using a pressure roller, followed by drying at 150° C. and calcinating at 500° C. for 2 hours to obtain a catalyst. The characteristics of this catalyst were measured in the same manner as in Examples 6 to 10.

With regard to the catalysts obtained in Examples 6 to 10 and Comparative Example 5, the obtained denitration ratio and the amount of the catalyst to be carried per area of the catalyst are collectively shown in Table 3. As is clear from this Table, all of the catalysts obtained in Examples have high denitration ratio though the amount of the catalyst to be supported is a fraction of that of the catalyst obtained in Comparative Example. This is resulted from the structure in which a small amount of the catalyst is carried uniformly inside of pores so that the diffusion of gas is promoted and therefore it is understood that the denitration catalyst using the catalyst base material of the present invention is a very excellent catalyst which is light-weight and has high activity.

TABLE 3

| No. | Catalyst | Amount of the catalyst component supported (g/m$^2$) | Denitration ratio (%) |
| --- | --- | --- | --- |
| 1 | Example 6 | 196 | 73.8 |
| 2 | Example 7 | 177 | 72.5 |
| 3 | Example 8 | 210 | 74.2 |
| 4 | Example 9 | 182 | 72.9 |
| 5 | Example 10 | 220 | 72.3 |
| 6 | Comp. Ex. 5 | 820 | 69.1 |

Example 11

6 g of a polyacrylic acid amide type polymer coagulant (trade name: Sunfresh ST500MPSA, manufactured by Sanyo Chemical Industries, Ltd., particle diameter: 20 to 50 μm) as a first component was suspended in 994 g of water to prepare a sherbet-like hydrated gel. Separately, 10 g of polyvinyl alcohol (trade name: Kuraray Poval 117, manufactured by Kuraray Co., Ltd.) was dissolved in 90 g of water to make a second component solution. Moreover, 500 g of diatomaceous earth (trade name: Radiolight W-50, manufactured by Showa Chemical Industry Co., Ltd., average particle diameter: 24.8 μm) and 1100 g of water were mixed to obtain a slurry-like fifth component solution. The ratio by volume of the above first component hydrated gel to the fifth component slurry was 1:1.

Next, 400 g of the hydrated gel which was the first component was mixed in the solution obtained by mixing 200 g of silica sol (manufactured by Nissan Chemical Industries, Ltd., $SiO_2$ content: 20% by weight) as a third component with 80 g of the second component solution, with which 270 g of the fifth component slurry was mixed and then 50 g of a milled fiber made of E-glass (diameter: 10 μm, length: 150 μm) was added to the above mixture solution to prepare a sherbet like slurry. Then, the same net-like base material that was used in Example 1 was made to pass through the above slurry and the same procedures as above were conducted to prepare a catalyst base material.

Example 12

A hydrated sol as the first component and the second and third components were prepared in the same manner as in Example 11. Next, 370 g of microparticle titanium oxide (trade name: CR-50, manufactured by Ishihara Sangyo Kaisha Ltd.) was added to a solution obtained by mixing 600 g of silica sol (manufactured by Nissan Chemical Industries, Ltd., $SiO_2$ content: 20% by weight) as a third component with 150 g of the second component solution. Then, 450 g of the first component hydrated gel was further added to the mixture, with which 310 g of the fifth component slurry was further mixed. Then, 126 g of a milled fiber made of E-glass (diameter: 10 μm, length: 150 μm) was added to the above mixture solution to prepare a sherbet like slurry. Then, the same netlike base material that was used in Example 1 was made to pass through the above slurry and the same procedures as above were conducted to prepare a catalyst base material.

Examples 13 and 14

Supports were prepared in the same manner as in Example 1 except that the amount of the fifth component in Example 11 was altered to 135 g and 405 g, respectively. The ratio by volume of the above first component hydrated gel to the fifth component slurry in these examples was 1:0.5 to 1:1.5.

Examples 15 and 16

Supports were prepared in the same manner as in Example 1 except that diatomaceous earth as the fifth component used in Example 11 was altered to amorphous silica (trade name: Tokuseal UR, manufactured by Tokuyama Corp., average particle diameter: 140 μm) and to other diatomaceous earth (trade name: Radiolight #500, manufactured by Showa Chemical Industry Co., Ltd., average particle diameter: 34.8 μm). The ratio by volume of the above first component hydrated gel to the fifth component slurry in these examples was 1:1.

Comparative Example 6

A support was prepared in the same manner except that no diatomaceous earth was added and the amount of the first component hydrated gel was altered to 1592 g in Example 11.

Comparative Examples 7 and 8

Supports were prepared in the same manner except that diatomaceous earth used in Example 11 was altered to quartz sand and amorphous silica used in Example 14 was altered to Micon F (trade name, manufactured by Tomita Pharmaceutical Co., Ltd., average particle diameter: 5 nm).

Comparative Example 9

When it was intended to prepare a support in the same manner as in Example 1 except that in Example 11, the first to fourth components were added to diatomaceous earth that was the fifth component without adding water in advance to the above diatomaceous earth, the fifth component could not be mixed uniformly. Although thereafter, water and other components were added, only a dry and crumbly slurry was obtained. The obtained slurry had poor adhesion to a metal lath and could not be therefore uniformly supported on the surface of the metal lath.

Test Example 1

Each support obtained in Examples 11 to 16 and Comparative Examples 6 to 9 was immersed in water, then taken out and drained off to measure water absorption based on the component carried on the metal lath.

Examples 17 to 22

15 kg of an aqueous ammonium metatungstate solution ($WO_3$ content: 50%) and 3.0 kg of ammonium metavanadate were added to 46.7 g of a titanium oxide powder (trade name: MCH, manufactured by Ishihara Sangyo Kaisha Ltd., $SO_4$ content: 2% by weight)), followed by kneading the mixture using a kneader. The obtained paste was granulated, dried and calcinated at 500° C. for 2 hours. 300 g of a powder obtained by pulverizing the obtained granules was added to a solution consisting of 210 g of silica sol (manufactured by Nissan Chemical Industries, Ltd., $SiO_2$ content: 20% by weight) and 420 g of water to prepare a Ti—W—V catalyst slurry. Each of the supports prepared in Examples 11 to 16 was dipped in the obtained slurry and then drained off using a fluoroplastic bar as a scraper, followed by drying at 150° C. and calcinating at 500° C. for 2 hours.

Comparative Examples 10 to 12

Each of the supports prepared in Comparative Examples 6 to 9 was dipped in the catalyst slurry obtained in Example 17 and then drained off using a fluoroplastic bar as a scraper, followed by drying at 150° C. and calcinating at 500° C. for 2 hours.

Test Example 2

Each catalyst obtained in Examples 17 to 22 and Comparative Examples 10 to 12 was cut into a strip of 100 mm×20 mm to make a test piece, which was subjected to a test to measure its denitration ratio in the condition shown in the foregoing Table 2. The results are shown in Table 5.

Test Example 3

Each catalyst prepared in Examples 17 to 22 and Comparative Examples 10 to 12 was cut into a form of 50 by 50 centimeter square and this test piece was secured to a table slanted at an angle of 45°. Separately, fly ash was screened through a 1000 μm mesh sieve, then dried at 120° C. for 2 hours, and mixed in an air stream such that the concentration of the fly ash in the air was 590 g/m³. Then the air was made to flow downward at a flow rate of 5 m/s and blown against the above test piece for 30 minutes to measure a difference in weight before and after the air was blown, as an abrasive loss. The results are shown in Table 5.

Each support obtained in Examples 11 to 16 exhibits, as shown in Table 4, an water absorption as very large as 1.5 to 2.6 g/g and it is found that the catalyst component is easily penetrable into the inside of the support. Also, each catalyst obtained by supporting a catalyst slurry on these supports was reduced in the abrasion loss in the powder abrasion test using dust, showing that it had sufficient strength to dust. The reason for this is considered to be that in the present invention, the water absorption was kept and also, the adhesion between the support and the catalyst component was improved and therefore, the catalyst was more improved in strength. In Comparative Examples 7 and 8, the water absorption of each support was low and the each catalyst of Comparative Examples 11 and 12 obtained by impregnating the support with the catalyst slurry was reduced in abrasive strength. When the catalyst obtained after the test was observed, the coating layer was peeled and fallen down from the surface of the catalyst. This is because in Comparative Examples 7 and 8, the catalyst component is not allowed to penetrate into the inside of the support even if the catalyst is supported thereon and therefore, the obtained catalyst has a structure in which the catalyst component is supported in a laminated state on the surface of the support, with the result that only the catalyst coating layer on the surface is peeled off from the surface by the dust in the abrasive test. In Comparative. Example 6, on the other hand, the water absorption of the support was high, but the obtained catalyst (Comparative Example 10) was reduced in abrasive strength, so that the inorganic fiber-containing component peeled off from the lath and a hole of the lath was opened. This is because in Comparative Example 6, the support itself has less strength though the support is porous and therefore, the catalyst together with the support is easily peeled off by the dust.

As mentioned above, the method and support of the present invention using an inorganic porous material as the fifth component ensures that since the strength is increased while the porosity of the support is kept, an excellent catalyst can be obtained which is resistant to peeling of the support itself and is free from the phenomenon that the catalyst is peeled off.

TABLE 4

| Example | Fifth component | Ratio by volume of hydrated gel:(porous material + Water) | Water absorption (cc/g) |
|---|---|---|---|
| Example 11 | Radiolight W-50 | 1:1 | 2.2 |
| Example 12 | Radiolight W-50 + CR50 | 1:1 | 1.5 |
| Example 13 | Radiolight W-50 | 1:0.5 | 2.6 |
| Example 14 | Radiolight W-50 | 1:1.5 | 1.8 |
| Example 15 | Tokuseal UR | 1:1 | 2.3 |
| Example 16 | Radiolight #50 | 1:1 | 2.4 |
| Comp. Ex. 6 | none | 1:0 | 2.6 |
| Comp. Ex. 7 | Diatomaceous earth + Quarts sand | 1:1 | 0.42 |
| Comp. Ex. 8 | Micon F only | 1:1 | 0.50 |
| Comp. Ex. 9 | Radiolight W-50 + CR50 | — | Unmeasurable |

TABLE 5

| Example | Amount of the catalyst to be supported (g/m$^2$) | Abrasion loss (g) | Denitration ratio (%) |
|---|---|---|---|
| Example 17 | 235 | 0.0093 | 74.1 |
| Example 18 | 220 | 0.0054 | 73.1 |
| Example 19 | 256 | 0.0082 | 72.8 |
| Example 20 | 220 | 0.0050 | 71.8 |
| Example 21 | 233 | 0.0042 | 73.1 |
| Example 22 | 254 | 0.0089 | 72.5 |
| Comp. Ex. 10 | 240 | 0.0304 | 70.1 |
| Comp. Ex. 11 | 232 | 0.0169 | 69.2 |
| Comp. Ex. 12 | 200 | 0.0240 | 71.1 |

EXPLANATION OF THE SYMBOLS

1. Hydrophilic polymer coagulant (gel particles), 2. Inorganic fiber, 3. Medium (water, organic thickener and the like), 4. Net-like base material, 5. Belt-like SUS plate, 6. Metal lath processing machine, 7. Dryer, 8. Molding machine, 9. Inorganic fiber-containing slurry, 10. Catalyst component slurry, 11. Draining roller, 12. Conveying roller.

The invention claimed is:

1. A method of producing a catalyst base material, the method comprising:
    (a) providing a catalytic base material slurry or paste, wherein the catalytic base material slurry or paste comprises:
        (i) a hydrophilic polymer coagulant which has a particle size of 20 to 50 μm and is able to absorb water to form swollen gel-like particles;
        (ii) a water soluble thickener;
        (iii) a colloidal inorganic binder;
        (iv) an inorganic fiber;
    (b) supporting the catalytic slurry or paste on a metal, net-like substrate such that the meshes of the metal, net-like substrate are filled up with the slurry or paste; and
    (c) drying and/or calcinating the substrate;
    wherein the slurry or paste comprises from 0.1 to 2% by weight of the hydrophilic polymer coagulant.

2. A method of producing a catalyst base material according to claim 1, wherein the catalytic base material slurry or paste further comprises:
    (v) an inorganic oxide powder.

3. A method of producing a catalyst base material according to claim 2, wherein carrying the slurry or paste on the net-like substrate such that the meshes of the net-like substrate are filled up with the slurry or paste comprises:
    passing a belt-like sheet as the net-like substrate through the slurry or paste; and
    then passing the sheet between a pair of rollers or a pair of scrapers placed at a fixed interval to remove superfluous slurry or paste supported on the sheet.

4. A method of producing a catalyst base material according to claim 1, wherein the catalytic base material slurry or paste further comprises:
    (v) an inorganic porous material having a pore volume of from 0.2 to 1.0 cc/g.

5. A method of producing a catalyst base material according to claim 4, wherein said inorganic porous material is diatomaceous earth and/or amorphous silica.

6. A method of producing a catalyst base material according to claim 4, wherein providing the catalytic base material slurry or paste comprises:
    mixing (v) the inorganic porous material with water to form a slurry-like material; and
    mixing the slurry-like material with (i) the hydrophilic polymer coagulant, (ii) the water soluble thickener, (iii) the colloidal inorganic binder, and (iv) the inorganic fiber.

7. A method of producing a catalyst base material according to claim 6, wherein said inorganic porous material is diatomaceous earth and/or amorphous silica.

8. A method of producing a catalyst base material according to claim 6, wherein the ratio by volume of a hydrated gel of the hydrophilic polymer coagulant to the slurry-like material obtained by adding water to the inorganic porous material exceeds 0 and is 2 or less.

9. A method of producing a catalyst base material according to claim 8, wherein said inorganic porous material is diatomaceous earth and/or amorphous silica.

10. A method of producing a catalyst base material according to claim 1, wherein said supporting the slurry or paste on the net-like substrate such that the meshes of the net-like substrate are filled up with the slurry or paste comprises:
   passing a belt-like sheet as the net-like substrate through the slurry or paste; and
   passing the sheet between a pair of rollers or a pair of scrapers placed at a fixed interval to remove superfluous slurry or paste supported on the sheet.

11. A method according to claim 1, wherein said hydrophilic polymer coagulant comprises one or more polymers selected from a polyacrylic acid amide, copolymers of acrylic acid amide and acrylic acid, derivatives of these polymer, graft copolymers of these polymers, mannan, fucoidan, and organic materials having carboxyl groups.

12. A method according to claim 1, wherein said water-soluble thickener comprises at least one compound selected from polyvinyl alcohol, carboxy cellulose, albumen and glue.

13. A method according to claim 1, wherein said colloidal inorganic binder comprises at least one compound selected from a silica sol, an alumina sol and a zirconia sol.

14. A method according to claim 1, wherein said water soluble thickener is polyvinyl alcohol and said colloidal inorganic binder is colloidal silica.

15. A method of producing a catalyst base material according to claim 1, wherein said hydrophilic polymer coagulant absorbs water to form gel-like particles swollen 300 to 500 times the self-weight of the hydrophilic polymer coagulant.

\* \* \* \* \*